United States Patent [11] 3,608,838

[72] Inventors Andrew P. Lundin
 323 Covington Raod;
 John D. Milner, 11945 Country Club Drive, both of Los Altos, Calif. 94022
[21] Appl. No. 39,339
[22] Filed May 21, 1970
[45] Patented Sept. 28, 1971

[54] APPARATUS FOR COMMINUTING ARTICLES
 16 Claims, 6 Drawing Figs.
[52] U.S. Cl. .................................................. 241/55,
 241/62, 241/101 M, 241/188 R, 241/285 A
[51] Int. Cl. ......................................................B02c 13/18,
 B02c 13/288
[50] Field of Search........................................... 241/41,
 55–56, 62, 188, 171, DIG. 23, 285 A

[56] References Cited
 UNITED STATES PATENTS
2,453,006 11/1948 Feight ........................... 241/186 X
2,825,377 3/1958 Ostrowski..................... 241/101 X
3,190,566 6/1965 Cressy........................... 241/56
3,214,105 10/1965 Owens........................... 241/188 X
3,448,932 6/1969 Prohl............................. 241/188 X Primary Examiner—Donald G. Kelly
Attorney—Townsend and Townsend ABSTRACT: A comminuter for reducing articles to small particles which has an upright housing with vertically spaced intake and discharge openings. A strong, rigid spider assembly comprised of a plurality of interconnected bars having tooth sides are secured to the interior of the housing between the openings. Rotatable cutting blades having sharp leading edges facing the toothed spider-blade sides are mounted below the spider assembly and include scraping members that move over the bottom of the housing and remove particles on the bottom to the discharge opening. The blades are driven via V-belts by a movably mounted motor which permits the tensioning and release of the V-belts A spray pipe is mounted to the op of the housing for the introduction of water to facilitate the removal of comminuted particles into the housing interior.

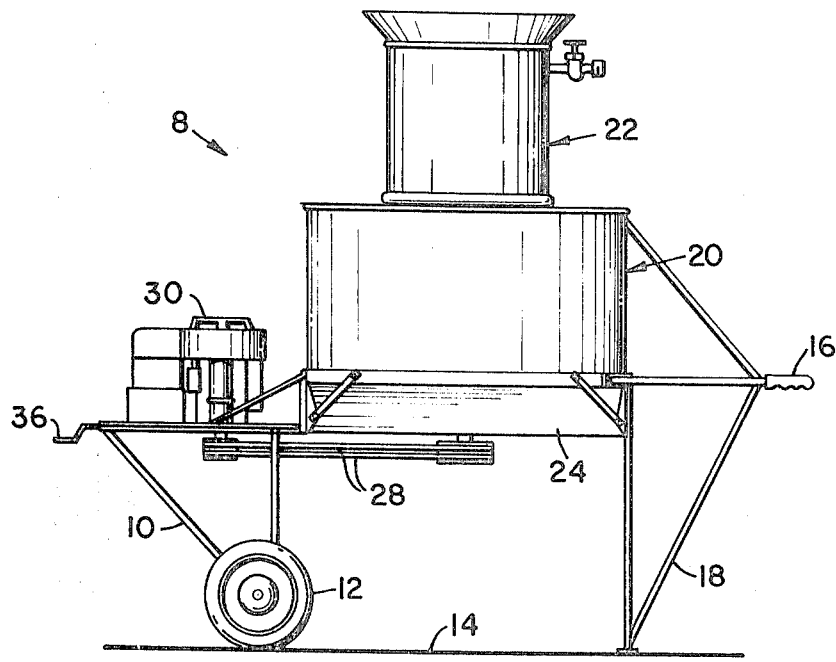
FIG_1
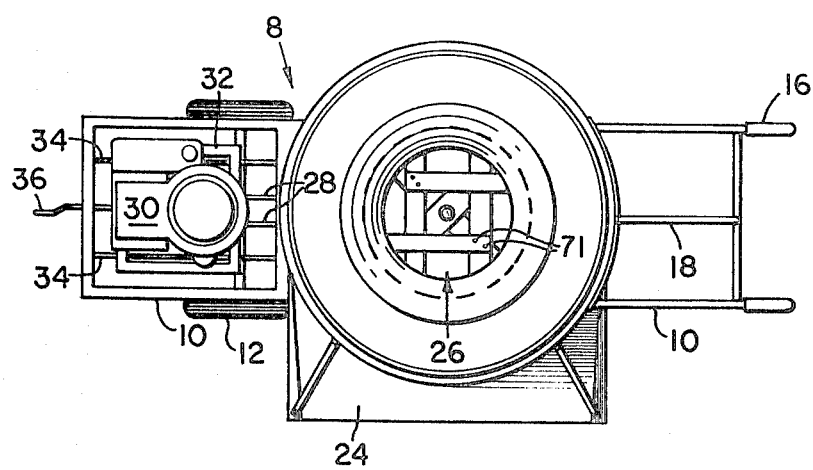
FIG_2

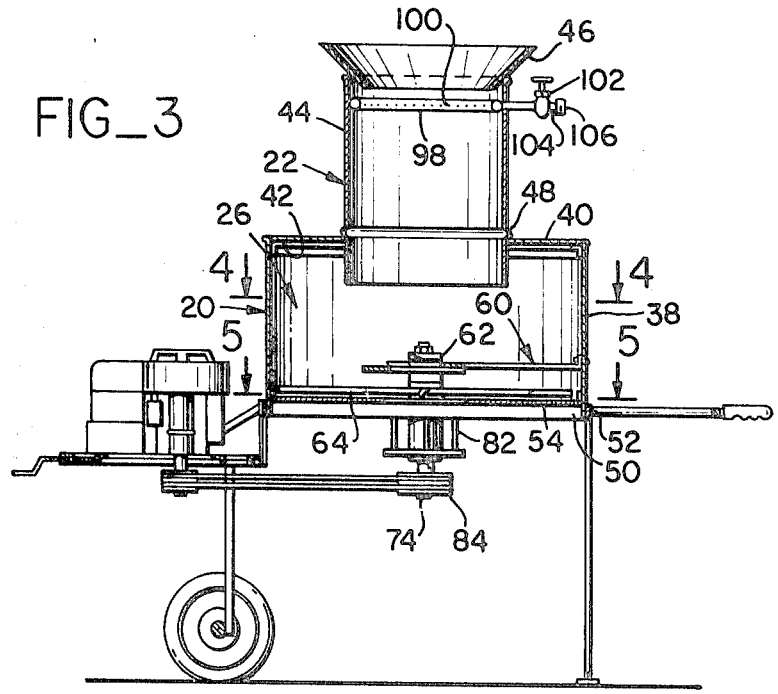
FIG_3
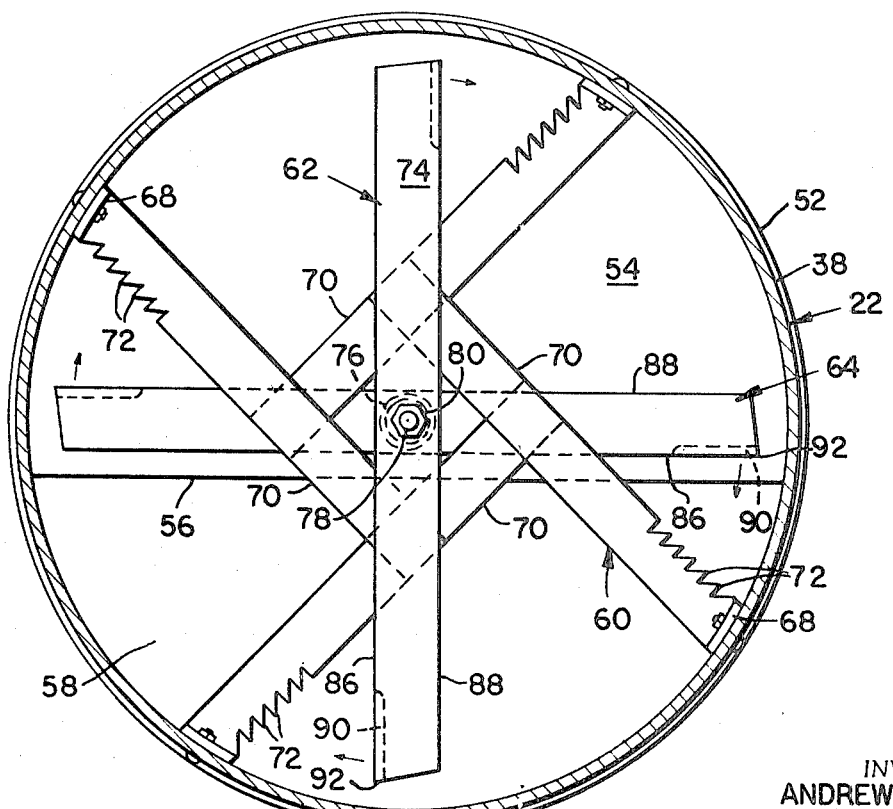
FIG_4
INVENTORS
ANDREW P. LUNDIN
JOHN D. MILNER
BY
Townsend and Townsend
ATTORNEYS

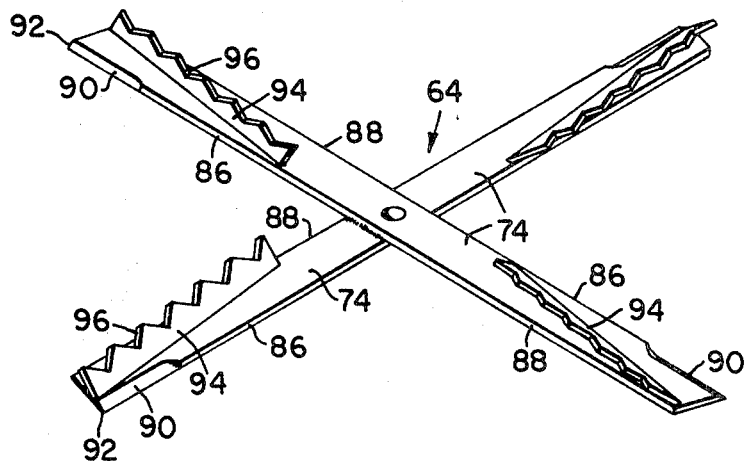
FIG_6
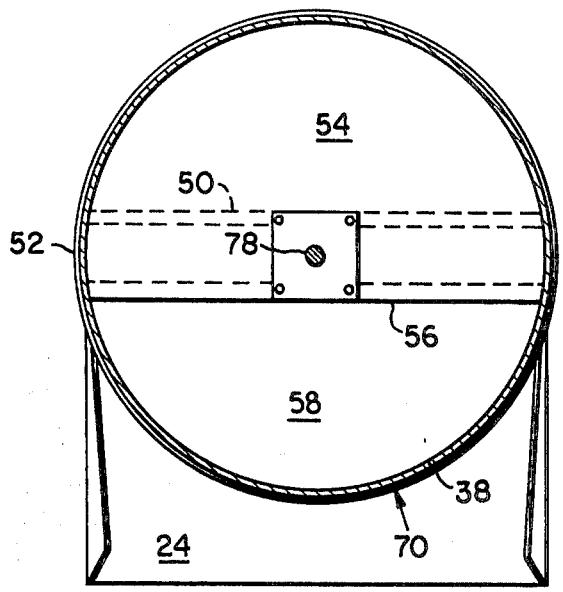
FIG_5

APPARATUS FOR COMMINUTING ARTICLES

BACKGROUND OF THE INVENTION

Pollution of the environment, be it the air, water, cultivated ground or street surfaces has become one of the greatest problems of out time. A large part of the pollution is caused by private individuals who dispose of their organic and inorganic waste and garbage by dumping it into waterways, on the ground or roadways and/or by burning organic wastes and garbage. When the waste is dumped it can cause serious pollution and creates an extremely unsightly appearance of the environment. The burning of organic matter, on the other hand, is a significant contributor to air pollution.

Professional waste disposal can be employed to reduce some of the pollution problems. However, the waste volume is often too great to handle and in many instances professional waste disposal is limited to certain types of waste and to certain geographic areas. Consequently, bulky types of waste, such as tree limbs, large quantities of leaves and the like remain on the premises unless burned. The physical characteristics and the volume and the bulkiness of the waste does not lend it for placement in the ground where it could be composted into desirable ground additives.

Attempts have been made to provide shredders or comminuters for waste materials such as limbs, grass, leaves and the like which reduce the materials to relatively small particles that can be spread over the ground, dug into it and which are self-eliminating through composting. Such devices usually provide a blade which rotates in a comminuting chamber and which, upon impact with articles placed into the machine, disintegrates the article. An example of such a device is shown and described in U.S. Pat. Nos. 2,825,377 and 3,412,770. These devices are adapted for disintegrating small articles such as leaves, twigs, shrubs and the like. However, large tree limbs cannot be handled by the devices due to the inability to place limbs in a proper position where the rotating blades can grasp the limbs and disintegrate them against stationary ribs.

Furthermore, the known devices place the operative components in intimate, close relationship. When handling wet materials, such as leaves, green tree branches and the like the machines have a tendency to clog and become inoperative unless disassembled and cleaned. This is tedious and time consuming and, therefore, renders these devices relatively undesirable.

SUMMARY OF THE INVENTION

The present invention provides a readily accessible, low-cost communicating apparatus for use with organic articles such as grass, leaves, heavy tree branches or paper products and with inorganic products such as glass bottles, cans and the like. The apparatus is self-cleaning, that is the accumulation of comminuted waste product particles is prevented by virtue of the arrangement of the cofunctioning parts as well as by virtue of the provision of means for facilitating the flow-through of the waste product in its original and in its comminuted form.

Briefly the apparatus of the present invention comprises a housing having an intake opening for the introduction of the articles into the apparatus and floor means defining a downwardly facing discharge opening for the particles disposed at a side of the housing. Stationary blade means are secured to the body and disposed intermediate the openings. Rotatable cutting blades are disposed in proximity of the stationary blades, and means are provided that continuously remove particles disposed on the floor means to the discharge opening. The cutting blades are rotated relative to the stationary blades whereby articles introduced through the intake opening are grasped by the cutting blades, impacted against the stationary blades and thereby disintegrated, and then discharged through the discharge opening.

In the preferred form of the present invention a spray tube is provided for introducing a water flow from adjacent the intake opening through the housing and past the discharge opening to facilitate the removal of comminuted particles. Moreover, the stationary and movable blades have coacting knife and toothed edges to increase the cutting, shredding and breaking action developed between them. This results in a reduction of the required power to operate the apparatus and increases the apparatus' capacity.

The housing includes a removable cover and intake chute to facilitate the inspection of the interior and repair or replacement of component parts that were damaged during operation of the machine.

The comminuting apparatus is constructed of relatively few and inexpensive parts and its ruggedness assures long, trouble-free operation to reduce its overall cost substantially below that of prior art comminuting devices. As a result a more widespread use of the apparatus is possible which should lead to a material reduction of environmental pollution resulting from the frequently encountered inability to dispose of solid waste in a nonpolluting manner.

BRIEF DESCRIPTION OF THE DRAWINGS

FIG. 1 is a side elevational view of the comminuting apparatus of the present invention;

FIG. 2 is a plan view of the apparatus illustrated in FIG. 1;

FIG. 3 is a side elevational view, in section, of the apparatus illustrated in FIG. 1;

FIG. 4 is an enlarged, fragmentary plan view and is taken on line 4—4 of FIG. 3;

FIG. 5 is a plan view, in section, and is taken on line 5—5 of FIG. 3; and

FIG. 6 is a perspective bottom view of the rotatable blades employed by the apparatus of the present invention.

DESCRIPTION OF THE PREFERRED EMBODIMENTS

Referring first to FIGS. 1 through 3, comminuting apparatus 8 comprises a frame 10 including means mounting a wheel 12 for movement of the apparatus over ground 14, handle 16 and support legs 18 which maintain the apparatus in an upright position. A hollow body 20 including an intake chute 22 on its upper end and a discharge chute 24 at its lower end is mounted to the frame. Comminuting means 26 are disposed interiorally of body 20 and are driven via V-belts 28 by drive means such as gasoline engine 30.

The engine is preferably mounted to a sled 32 movably engaged by members 34 of frame 10 and movable towards and away from body 20 with a lead screw (not separately shown) actuated by a crank 36 to loosen or tighten the V-belts. During operation of the apparatus the V-belts remain taut for rotating the comminuting means 26. During nonuse of the apparatus and when the engine is idling, or to start the engine, the V-belts are loosened so that the comminuting means are disengaged and remain stationary while the motor drive wheel rotates.

Referring now to FIGS. 3 through 6, a body 20 comprises an upright cylindrical housing 38 to which a circularly shaped cover 40 is removably mounted with the help of a circularly shaped angle 42 secured to the upper end of the housing. Cover 40 includes a concentric cutout into which intake chute 22, comprising a cylindrical section 44 and a funnel member 46, are loosely placed. The cylindrical section has an outwardly extending annular protrusion 48 which engages cover 40 and prevents the intake chute from dropping through the circular cutout in the cover.

The lower end of housing 38 rests on a transverse channel 50 carried by frame 10 and is annularly supported by circular outer band 52 of the frame. The lower housing end further mounts a flat floor plate 54 that is secured to the housing, extends past the center of the housing (as best seen in FIG. 4) and that terminates in a straight edge 56 to thereby define a segment-shaped discharge opening 58.

Comminuting means 26 generally comprise a stationary spider assembly 60 and rotatable cutting blade sets 62 and 64 disposed on each side of the spider assembly. The spider assembly is defined by at least three and preferably four bar members 66 that have outer ends 68 secured to housing 38 at equally spaced points and inner ends 70 secured to each other with threaded bolts 71 to thereby define a substantially horizontally disposed spider assembly and a central passageway. The interconnection of the four bars provides a rigid structure capable of withstanding large horizontally acting forces. The side of the bar members 66 facing in a counterclockwise direction, as viewed in FIG. 4, include a plurality of sharp teeth 72 for purposes more fully described hereinafter.

Cutting blade sets 62 and 64 are disposed in horizontal planes on each side of spider assembly 60. Upper set 62 comprises a pair of opposing, preferably integrally constructed blades 74 which extend outwardly in radial directions and which are secured to a concentrically disposed, downwardly extending tubular connecting member 76. The other end of the connecting member is secured to lower blade set 64 which comprises two perpendicular pairs of opposing blades 74. The blades are keyed onto a central shaft 78, are secured thereto with a nut 80 and the shaft is rotatably mounted in a sealed bearing 82 depending downwardly of and secured to channel 50. A free end of shaft 78 protruding past the bearing mounts a sheave 84 driven by V-belts 28.

Each blade set is disposed a short distance above and below, respectively, spider assembly 60 and includes a leading edge 86 facing towards spider assembly teeth 72 and a trailing edge 88 facing in the opposite direction. At least an outer portion 90 of the leading edge is sharpened whereby the placement of an article between the rotating cutting edge sets and the spider assembly crushes the article against spider bar members 66 between teeth 72 and cutting edge 90. A cutting, shredding and breaking action of the article into small particles takes place between the spider bar members and the cutting blades and is substantially enhanced by the provision of the teeth and the sharp edge.

During operation of the comminuter wet articles introduced into the comminuting means have a tendency to cake against walls of housing 38. The cake buildup can result in substantial friction between the rotating blades and the cake and a correspondingly increased power consumption. To avoid such friction leading edge 86 is slightly longer than trailing edge 88 to define a relatively sharp scrape point 92 followed by an inwardly tapering section between the two blade edges. The scrape point continuously scrapes particles building up on the housing walls and thus minimizes frictional losses from cake buildup.

Referring now particularly to FIGS. 3 and 6, each blade 74 of lower cutting blade set 64 includes a downwardly extending scraper 94 which extends inwardly from the outer end of the blade and is defined by a bar terminating in a lower toothed edge 96. The scraper slopes downwardly and rearwardly, that is away from sharp cutting edge 90, and is disposed at an angle to the longitudinal axis of the plate. The scraper is so dimensioned that the tooth points are positioned just above floor plate 54 so that particles on the floor plate are engaged by the scraper and pushed along the floor plate until the particles pass edge 56. The downwardly and rearwardly sloping configuration of the scrapers, and the relatively high speed of the blades now forces the particles downwardly through the discharge opening and onto the discharge chute 24 from where they drop onto the floor or suitable conveying means (not separately shown) removing the comminuted particles from the vicinity of the apparatus.

Turning now to the operation of the comminuting apparatus of the present invention and referring to FIGS. 1 through 6, engine 30 is started and crank 36 is turned to tighten belts 28 and rotate cutting-blade sets 62 and 64 inside housing 38. In the presently preferred embodiment of the invention the blade-set diameter is approximately 21 inches and the blades are constructed of 3 inch x ⅜ inch cross section flat steel bars to provide the sets with a substantial mass. These blades are rotated at a speed of about 1,100 r.p.m. and the engine has a rated power output of between 5 to 6 horsepower. Articles to be comminuted can now be inserted into the apparatus through intake chute 22. Such articles can include leaves, paper, twigs, heavy branches of up to 2 inch diameter and more, and even glass bottles and metal cans. Upon introduction of the articles into the interior of housing 38 they are grasped by the upper blade set rotating at high speed and immediately impacted against spider assembly 60 where an initial disintegration of the articles takes place. Thereafter the articles continue to be grasped by the upper and lower cutting blade sets until they drop through discharge openings 58 or onto floor plate 54 from where scrapers 94 remove them and discharge them through the discharge opening. The cooperating sharp cutting edges 90 of cutting blades 74 and teeth 72 of spider bar members 66, as well as the massiveness of the blade sets which prevent significant speed reductions of the sets even when contacting heavy tree branches, assure a virtual explosion of the inserted articles into small fragmentary particles. A buildup of disintegrated particles on floor plate 54 is prevented by scrapers 94. A buildup of a particle cake on the interior walls of housing 38 is prevented by scrape point 92 on the outer end of the cutting blades. Long and trouble-free operation of the apparatus is thus assured.

Discharge chute 24 is so positioned that articles leaving the interior of housing 38 are deflected to a side of the apparatus. The operator of the machine who inserts articles through intake chute 22 is positioned on the opposite side of the machine where he is protected from contact by disintegrated particles leaving the housing interior at high velocities. Possible injuries are thereby prevented.

Should inspection of the housing interior or of comminuting means 26 become necessary intake chute 22 can be simply lifted off cover 40 to provide ample light and access. Replacement of one or more components of the comminuting means is accomplished by removing cover 40 from the housing top, loosening nut 80 and bolts securing the spider assembly to the housing and lifting the spider assembly and the interconnected blade sets 62 and 64 off shaft 78. Loosening of bolts 71 connecting the ends of spider bar members 66 to each other enables removal of spider assembly 60 from between the blade sets.

When comminuting high-moisture-content articles, such as wet leaves, grass or paper, the disintegrated particles form a mulchy and sticky substance. To facilitate the removal of this substance from the housing interior a spray pipe 98 is preferably secured to the upper part of body 20, such as to cylindrical section 44 of intake chute 22 below the lower end of funnel member 46 protecting the pipe from contact by and damage from incoming articles. The pipe has a preferably annular configuration and includes a plurality of openings 100 through which water is discharged into housing 38. The water is supplied via a shutoff valve 102 and an intake pipe 104 terminating in a conventional pipe or hose connection 106. The discharged water flows past comminuting means 26 where it mixes with the disintegrated, mulchy particle substance and liquifies it to facilitate the discharge of the substance through opening 58. Actuation of spray pipe 98 is further useful for cleaning housing 38 and for providing a water spray when comminuting dry articles such as dry leaves to reduce or eliminate attendant dust.

When comminuting relatively light articles, such as dry leaves, paper, dry grass and the like it is desirable to induce an airflow from intake chute 22 via the housing interior and past discharge opening 58. For this purpose it is presently preferred to provide cutting blades 74 with a twist extending over their length and oriented so that rotation of the cutting blade sets causes a downdraft air from the intake chute past comminuting means 26 and through discharge opening 58. The insertion of material to be comminuted is thereby substantially facilitated and the throughput capacity of the apparatus is increased.

We claim:

1. Apparatus for disintegrating articles into small particles comprising: a body having an intake opening for the introduction of articles into the apparatus and floor means defining a downwardly facing discharge opening for the particles disposed at a side of the body, stationary blade means secured to the body and disposed intermediate the openings, rotatable cutting blades disposed in proximity of the stationary blades, means driven by the cutting blades for continuously removing particles disposed on the floor means to the discharge opening, and means for rotating the cutting blades relative to the stationary blades whereby articles introduced through the intake opening are grasped by the cutting blades, impacted against the stationary blades and thereby disintegrated, and then discharged through the discharge opening.

2. Apparatus according to claim 1 wherein the particle-removing means includes means depending from the cutting blades for moving particles disposed on the floor means towards the discharge opening and for biasing such particles through the discharge opening out of the body interior.

3. Apparatus according to claim 1 wherein at least one of the stationary and cutting blades includes a toothed edge against which articles are forced to increase the disintegration of such article.

4. Apparatus according to claim 3 wherein the other one of the stationary blades and the cutting blades includes a sharp edge facing the toothed edge when the cutting blades rotate.

5. Apparatus according to claim 1 including means for passing water from adjacent the intake opening past the stationary blade means and the cutting blades and through the discharge opening.

6. Apparatus for comminuting waste products into fine particles comprising:
a frame;
an upright hollow body defining a concentrically located intake opening at its upper end and having floor means extending partially across a lower end of the body to define a discharge opening;
at least one set of cutting blades disposed above the floor means and including downwardly depending scrapers positioned immediately above the floor means for transporting particles from the floor means to the discharge opening;
means rotatably mounting the cutting blades concentrically within the body;
means for rotating the cutting blades; and
stationary impact blades axially spaced from the cutting blades and secured to the body concentrically with the cutting blades so that articles placed into the apparatus through the intake opening are contacted by the moving blade, moved against the stationary blades and are there cut, shredded and broken into particles which are discharged through the discharge opening.

7. Apparatus according to claim 6 wherein the body comprises a cylindrical housing, a generally circular top plate including a concentric cutout, means demountably securing the plate to the housing, and intake chute means removably positioned in the cutout whereby removal of the intake chute means enables inspection of the blades and removal of the top plate enables repair and replacement of the blades.

8. Apparatus according to claim 6 wherein the floor means extends over more than one-half of the ground cross section of the body and wherein the scraper means comprise sloped plates extending over a portion of the length of the cutting blades and sloping downwardly and rearwardly, in a direction opposite to the direction of rotation of the cutting blades, the plates further having a lower end defined by a plurality of angularly inclined sharp edges.

9. Apparatus according to claim 6 wherein the cutting blades comprise a plurality of cutting blade sets disposed above and below the stationary blades, and wherein the stationary blades comprise a plurality of at least three horizontally disposed plate members having outer ends secured to the body and inner end sections secured to end sections of at least two other stationary blade members.

10. Apparatus according to claim 6 wherein the radial length of the leading edge of the cutting blades exceeds the radial length of the trailing edge of the cutting blades to thereby define a sharp outermost cutting-blade edge for the removal of particles caked to an inner wall of the body to reduce friction and power consumption of the apparatus. rotatable 11. Apparatus according to claim 6 including a spray pipe disposed adjacent the intake opening for mixing the particles with water to facilitate their discharge from the body, and means for connecting the spray pipe with a source of water.

12. Apparatus according to claim 11 including valve means for throttling and blocking the water flow from the source to the spray pipe.

13. Apparatus for comminuting articles into small particles comprising: a frame, an upright cylindrical housing mounted to the frame, a cover including removable intake chute means secured to the housing permitting introduction of the articles into the housing via the chute means, a floor member defining the lower end of the housing, secured to the housing and defining with the lower housing end a downwardly facing discharge opening positioned on one side of the housing, a substantially horizontally positioned spider assembly defined by a plurality of substantially flat horizontally disposed bar members having first ends demountably secured to each other adjacent the center of the housing and second ends demountably secured to the housing intermediate the cover and the floor member, edges of the bar members facing in common directions including a plurality of relatively sharp teeth, a plurality of cutting blades rotatable in substantially horizontal planes and disposed on the underside of the spider assembly in a substantially horizontal orientation and having relatively sharp leading edges facing the teeth on the bar members, the cutting blades including means sweeping the floor member when the blades rotate for removal of particles from the floor member to the discharge opening, means rotatably mounting the cutting blades to the frame, and means for rotating the cutting blades so that the insertion of articles through the intake chute means causes the comminuting of the articles between the rotating cutting blades and the spider assembly and discharge of the particles through the discharge opening.

14. Apparatus according to claim 13 including means for introducing a water flow into the housing to facilitate the discharge of the particles.

15. Apparatus according to claim 13 including a second cutting-blade set disposed on the upper side of the spider assembly, and means rigidly connecting the cutting blade sets.

16. Apparatus according to claim 13 wherein the cutting blades are twisted about their longitudinal axes for defining an air foil inducing, upon rotation of the cutting blades, an airflow from the intake chute means, past the intake opening, the housing and out through the discharge opening to facilitate the flow-through of the articles and the particles.